United States Patent [19]

Gitzendanner

[11] 4,117,997

[45] Oct. 3, 1978

[54] MOTOR ISOLATION MOUNT FOR DISK DRIVES

[75] Inventor: Louis G. Gitzendanner, Oklahoma City, Okla.

[73] Assignee: Honeywell Information Systems Inc., Waltham, Mass.

[21] Appl. No.: 590,455

[22] Filed: Jun. 26, 1975

Related U.S. Application Data

[63] Continuation-in-part of Ser. No. 462,460, Apr. 19, 1974, abandoned.

[51] Int. Cl.[2] .............................. F16F 15/00
[52] U.S. Cl. ...................... 248/20; 248/23; 248/358 R
[58] Field of Search .................. 248/14–16, 248/19–26, 358; 310/12–14

[56] References Cited

U.S. PATENT DOCUMENTS

| | | | |
|---|---|---|---|
| 1,593,744 | 7/1926 | Benning | 248/23 |
| 1,912,167 | 5/1933 | Anderson | 310/13 |
| 1,951,020 | 3/1934 | Hoevel | 248/21 |
| 1,972,441 | 9/1934 | Gosslau | 248/26 X |
| 1,973,187 | 9/1934 | Van Sciver | 248/21 |
| 2,046,511 | 7/1936 | Guth | 248/26 |
| 2,079,391 | 5/1937 | Wolfe | 248/21 |
| 2,404,403 | 7/1946 | Poylo | 248/358 R |
| 2,674,835 | 4/1954 | Senft | 248/22 |
| 2,873,940 | 2/1959 | Brooke et al. | 248/358 AA |
| 2,998,867 | 9/1961 | Dall | 248/20 X |
| 3,011,776 | 12/1961 | Reed | 248/22 X |
| 3,115,323 | 12/1963 | Crandell | 248/358 AA |
| 3,155,851 | 11/1964 | Francis | 310/13 |
| 3,244,393 | 4/1966 | Wallerstein | 248/358 AA |
| 3,312,920 | 4/1967 | Twomey | 248/20 X |
| 3,643,242 | 2/1972 | Bryer | 310/12 |
| 3,768,083 | 10/1973 | Pejcha | 360/98 |

*Primary Examiner*—Lawrence J. Staab
*Attorney, Agent, or Firm*—Ronald T. Reiling; Nicholas Prasinos; George Grayson

[57] ABSTRACT

In a data storage apparatus, a motor isolation mount for isolating a linear magnetic motor from a base plate so that forces imparted by the motor to the base plate do not excite resonance which might cause head-to-track positioning errors.

7 Claims, 5 Drawing Figures

MOTOR ISOLATION MOUNT FOR DISK DRIVES

BACKGROUND OF THE INVENTION

This application is a continuation in part of application Ser. No. 462,460, entitled MOTOR ISOLATION MOUNT FOR DISK DRIVES, filed on Apr. 19, 1974, now abandoned.

1. Field of the Invention

This invention relates, generally, to a motor isolation mount used in a data storage apparatus and more particularly, but not by way of limitation, to an improved motor mount for securing a magnetic motor assembly to an elongated base plate.

2. Description of the Prior Art

In most prior art disk drives using a linear motor commonly called a "voice coil actuator" for positioning the read/write head over a desired cylinder of information, it is common that forces are imparted on the base plate because of the movement of the coil and the motor being rigidly attached to the base plate. These forces excite resonance in the base plate and attached elements such as the spindle and disks. The vibrations cause head-to-track positioning errors. Also, the forces set up a resonance with such a high frequency that the servo system for positioning the heads generally cannot correct for head-to-track positioning errors. The resonance problem was recognized in U.S. Pat. No. 3,768,083 to Pejcha, which discloses the use of separate base plates in an effort to dampen the vibrations. While the assembly shown in the Pejcha patent has separate base plates, the base plates are still interconnected and the assembly does not dampen the forces causing the resonance at its motor source.

Elastomeric pads have been used in mounting the motor to the base plate but due to the wear and fatigue of these pads, this method has had limited success.

U.S. Pat. No. 3,643,242 to Bryer discloses the use of a pair of rods in which a stator for a linear motor rides thereon in the direction of linear displacement. While this disclosure recognizes the need for displacement of the motor, the invention does not provide for a biasing means to control the friction imparted between the motor and the stator.

SUMMARY OF THE INVENTION

The above mentioned problems are solved by allowing the magnetic motor assembly to travel in a direction parallel to the direction of travel of the actuator coil and by controlling the energy loss when sliding occurs by use of low friction bearing materials and biasing forces.

The present invention relates to a data storage apparatus having a magnetic motor assembly, a movable coil secured to the assembly, an elongated base plate, and a motor mount securing the magnetic motor assembly to the base plate. The improvement includes the motor mount which allows movement of the motor away from an equilibrium portion on the base plate and compression coils secured to the motor mount and the base plate for controlling the amount of friction between the motor mount and the base plate during the movement of the motor mount.

BRIEF DESCRIPTION OF THE DRAWINGS

While the specification concludes with claims particularly pointing out and distinctly claiming that which is regarded as the present invention, details of a preferred embodiment of the invention along with its further objects and advantages may be more readily ascertained from the following detailed description when read in conjunction with the accompanying drawings wherein:

DESCRIPTION OF THE PREFERRED EMBODIMENT

Figure 1:
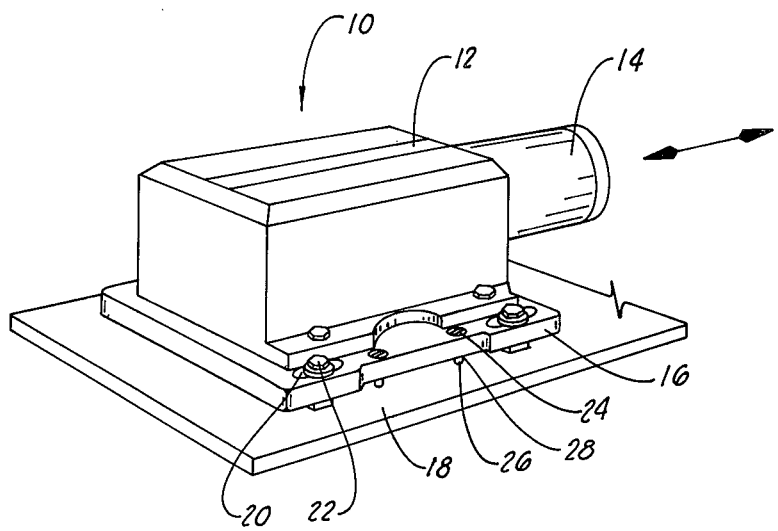
FIG. 1 is a perspective view of the magnetic motor assembly.

The data storage apparatus is shown as general reference character 10. Included in this apparatus are magnetic motor assembly 12, movable coil 14, motor mount 16 and elongated base plate 18. Included in the motor mount 16 are elongated bolt slots 20, bolts 22 for securing the motor mount 16 to the base plate 18, spring retaining plugs 24, springs 26 and spring locating pins 28.

Figure 2:
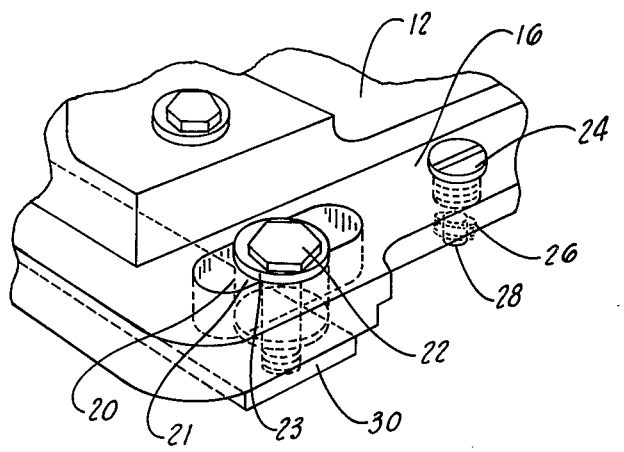
FIG. 2 is a perspective view of the motor mount.

Referring now to FIG. 2, the motor mount 16 is more clearly depicted. The elongated bolt slot 20 is shown receiving bolt member 22 having a washer 23 and a low friction bushing 21. Also shown more clearly in FIG. 2 is spring retainer plug 24, spring 26, spring locating pin 28 and a slide bearing pad 30.

Figure 3:
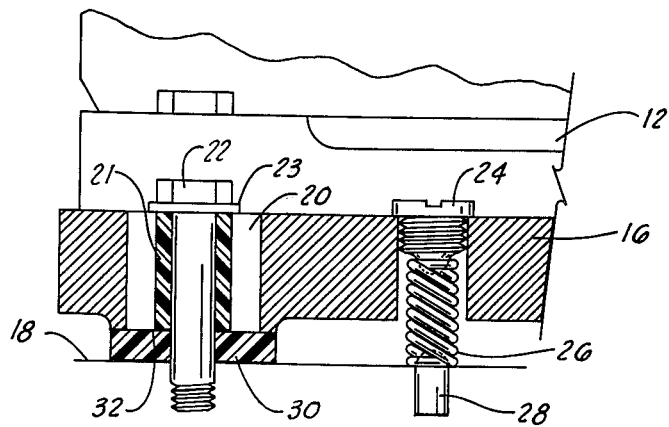
FIG. 3 is a side view of the motor mount in an equilibrium position on the base plate.

FIG. 3 depicts the motor mount 16 in equilibrium with spring 26 in a neutral position. Bolt member 22 is shown in position 32 equal distance from the elongated sides of bolt slot 20.

In operation, the magnetic motor assembly 12 is secured to the base plate 18 by bolt members 22 inserted into elongated slots 20. The bolt members 22 act only as safety stops to prevent vertical movement of the assembly 12 during shipment and installation. The bolt members 22 are not used to control the horizontal movement of the assembly 12 on the base plate 18. The horizontal movement of the assembly 12 is controlled by the weight of the assembly 12, the compressional strength of the spring 26 and the amount of friction between the assembly 12 and the base plate 18.

The spring 26 serves a number of purposes. It aids in controlling the amount of friction along the slide bearing pad 30 disposed between the motor mount 16 and the elongated base plate 18 and, the spring 26 provides a biasing force which influences the motion of the motor mount 16 relative to the elongated base plate 18 and tends to keep the average position of the magnetic motor assembly 12 centered in a neutral position 32 as shown in FIG. 3.

The elongated bolt slot 20 acts as a means for allowing the motor mount 16 to slide both forward and backward in a direction parallel to the movement of the actuator coil 14.

Figure 4:
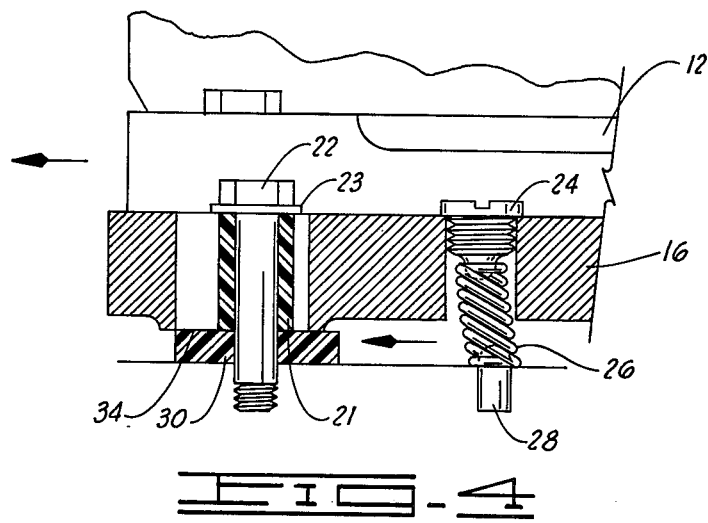
FIG. 4 is a side view of the motor mount moved away from an equilibrium position on the base plate.
Figure 5:
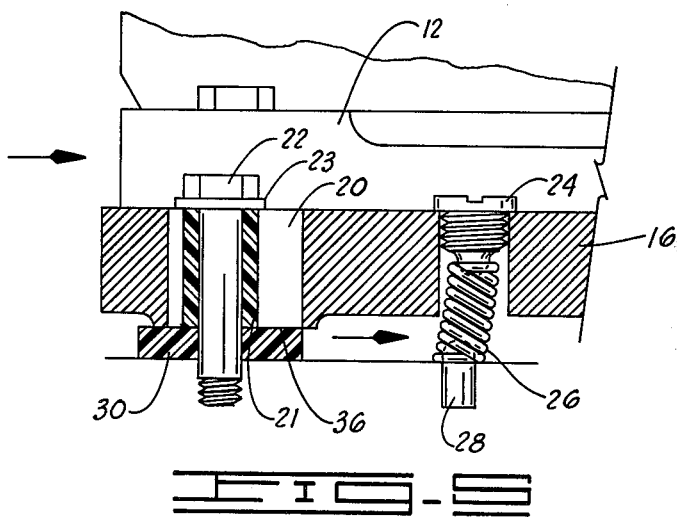
FIG. 5 is a side view of the motor mount moved away from an equilibrium position on the base plate.

This forward and backward movement is depicted in FIG. 4 and FIG. 5. When the actuator coil 14 is extended away (i.e., to the right as shown in FIG. 1) from the magnetic motor assembly 12, the mount 16 assumes a position 34, shown in FIG. 4. When the coil 14 is retracted (i.e., to the left as shown in FIG. 1) toward the magnetic motor assembly 12, the motor mount 16 assumes a position 36, shown in FIG. 5, which again is opposite the direction of the movement of the coil 14.

The low friction bearing material and biasing forces are not designed to provide for a minimum amount of friction between the motor mount 16 and base plate 18, but are designed for a specific amount of friction in controlling the directional travel.

The magnetic motor assembly 12 has a large mass relative to the mass of the coil actuator 14 and the attached carriage system which includes the read/write head, not shown in the enclosed FIGURES. Therefore, the travel of the magnetic motor assembly 12 is linked to the mass ratio times the carriage travel (i.e., in the current design, the motor 12 travels 0.06 inches for a 2 inch coil travel). Because the motor's travel is limited, the motion of the magnetic motor assembly 12 relative to the base plate 18 can be controlled and offset by the slide bearing system and springs already described with a significant reduction in the forces transmitted from the magnetic motor assembly 12 to the base plate 18, thereby appreciably reducing the tendency to excite resonance in the base plate 18 and items mounted thereto.

Changes may be made in the combination and arrangements of the elements as heretofore set forth in the specifications and shown in the drawings without departing from the spirit or scope of the invention as defined in the following claims. What is claimed is:

1. In a data storage apparatus having a linear magnetic motor assembly, a movable coil attached to the linear magnetic motor assembly, an elongated base plate assembly, and a motor mount secured to the base plate assembly by bolt means, the improvement comprising:
   (a) means for allowing movement of the motor mount away from an equilibrium position on the base plate assembly when the movable coil is actuated limited to a direction parallel to the direction of travel of the movable coil; and
   (b) biasing means secured to the motor mount and the base plate assembly for controlling the amount of friction between the motor mount and the base plate assembly during the movement of the motor mount, said biasing means providing a force for returning the motor mount to said equilibrium position.

2. The apparatus as defined in claim 1 wherein said biasing means supports a portion of the weight of the magnetic motor assembly.

3. The apparatus as defined in claim 1 wherein said biasing means is a coil spring.

4. The apparatus as defined in claim 1 wherein said means for allowing movement of the motor mount comprises:
   (a) a low friction bushing surrounding said bolt means; and
   (b) an elongated bolt slot, the width of said slot being substantially equal to the width of said bushing.

5. In a data storage apparatus having a magnetic motor assembly, a movable coil attached to the magnetic motor assembly, an elongated base plate assembly, and a motor mount securing the magnetic motor assembly by a plurality of bolts or the like to the base plate assembly, the improvement comprising:
   (a) a low friction bushing surrounding each of said bolts;
   (b) an elongated bolt slot for each of said bolts, the width of each slot being substantially equal to the width of a bushing; and
   (c) a coil spring secured to the motor mount and the base plate assembly for biasing the magnetic motor assembly in an equilibrium position and controlling the amount of friction between the motor mount and the base plate assembly.

6. The apparatus as defined in claim 5 wherein said base plate assembly further includes a low friction bearing pad and an elongated base plate, said low friction pad being disposed between the motor mount and the elongated base plate.

7. The apparatus as defined in claim 6 wherein said coil spring supports a portion of the weight of the magnetic motor assembly.

* * * * *